US009409132B2

(12) United States Patent
Brandimarte et al.

(10) Patent No.: US 9,409,132 B2
(45) Date of Patent: *Aug. 9, 2016

(54) PTFE MEMBRANE

(75) Inventors: Richard Brandimarte, Bensalem, PA (US); Kirit Patel, Bridgewater, NJ (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/906,356

(22) Filed: Oct. 18, 2010

(65) Prior Publication Data

US 2011/0254186 A1    Oct. 20, 2011

Related U.S. Application Data

(63) Continuation of application No. 11/287,164, filed on Nov. 23, 2005, now Pat. No. 7,922,946.

(60) Provisional application No. 60/631,087, filed on Nov. 24, 2004.

(51) Int. Cl.
*B29C 67/20* (2006.01)
*B29C 43/02* (2006.01)
*B01D 71/36* (2006.01)
(Continued)

(52) U.S. Cl.
CPC ............ *B01D 71/36* (2013.01); *B01D 67/0027* (2013.01); *B01D 67/0083* (2013.01); *B01D 67/0086* (2013.01); *B01D 69/02* (2013.01); *B29C 43/22* (2013.01); *B29C 71/02* (2013.01); *C08J 5/2237* (2013.01); *B01D 2323/08* (2013.01); *B01D 2323/10* (2013.01); *B01D 2325/20* (2013.01); *B29C 43/46* (2013.01); *B29C 2071/027* (2013.01); *B29K 2027/18* (2013.01);
(Continued)

(58) Field of Classification Search
CPC ...... B29C 43/24; B29C 55/18; B29C 55/005; B29C 43/22
USPC ........... 264/175, 241, 280, 288.4, 288.8, 299, 264/319, 322, 330, 331.14, 346; 428/304.4, 428/306.6, 308.4
See application file for complete search history.

(56) References Cited

U.S. PATENT DOCUMENTS 3,315,020 A    4/1967  Gore
3,953,566 A    4/1976  Gore
(Continued)

FOREIGN PATENT DOCUMENTS

GB    1475316       6/1977
JP    10-165787     6/1998
JP    2002275280    9/2002

OTHER PUBLICATIONS

First Office Action from corresponding Chinese Application No. 200580040218.9, mailed Aug. 7, 2009 (English Translation), pp. 1-11.

(Continued)

*Primary Examiner* — Robert J Grun
(74) *Attorney, Agent, or Firm* — Pauly, DeVries Smith & Deffner LLC

(57) ABSTRACT

A method for improving the dimensional stability of PTFE membranes by the application of elevated temperature and elevated pressure to a PTFE membrane. The process reduces and/or eliminates the relaxation stress normally associated with PTFE membranes made using previously existing methods.

13 Claims, 2 Drawing Sheets

(51) Int. Cl.
   *B01D 67/00*   (2006.01)
   *B01D 69/02*   (2006.01)
   *B29C 43/22*   (2006.01)
   *B29C 71/02*   (2006.01)
   *C08J 5/22*    (2006.01)
   *B29C 43/46*   (2006.01)
   *B29K 27/18*   (2006.01)
   *B29L 31/00*   (2006.01)

(52) U.S. Cl.
   CPC ........ *B29L 2031/755* (2013.01); *C08J 2327/18* (2013.01)

(56) References Cited

U.S. PATENT DOCUMENTS

| | | | |
|---|---|---|---|
| 3,962,153 A * | 6/1976 | Gore | 521/79 |
| 4,187,390 A | 2/1980 | Gore | |
| 4,194,041 A | 3/1980 | Gore et al. | |
| 4,891,407 A | 1/1990 | Mitchell | |
| 4,945,125 A | 7/1990 | Dillon et al. | |
| 5,066,683 A | 11/1991 | Dillon et al. | |
| 5,157,058 A | 10/1992 | Dillon et al. | |
| 5,362,553 A | 11/1994 | Dillon et al. | |
| 5,476,589 A | 12/1995 | Bacino | |
| 5,552,100 A * | 9/1996 | Shannon et al. | 264/127 |
| 5,814,405 A | 9/1998 | Branca et al. | |
| 5,910,277 A * | 6/1999 | Ishino et al. | 264/127 |
| 6,080,472 A * | 6/2000 | Huang et al. | 428/315.5 |
| 6,162,514 A * | 12/2000 | Moriya | 428/1.1 |
| 6,235,377 B1 | 5/2001 | Dillon et al. | |
| 6,770,086 B1 | 8/2004 | Girton | |
| 7,922,946 B2 | 4/2011 | Patel | |
| 2003/0062644 A1 | 4/2003 | Oyama et al. | |
| 2003/0194547 A1 | 10/2003 | Fuhrmann et al. | |
| 2011/0254186 A1 | 10/2011 | Brandimarte et al. | |

OTHER PUBLICATIONS

Second Office Action from corresponding Chinese Application No. 200580040218.9, mailed Nov. 3, 2010 (English Translation), pp. 1-8.

Communication pursuant to Article 94(3) EPC, from corresponding European Application No. 05 850 014.1-1213, mailed Aug. 25, 2008, pp. 1-3.

Second Communication pursuant to Article 94(3) EPC, from corresponding European Application No. 05 850 014.1-1213, mailed Jul. 14, 2010, pp. 1-5.

Response to European Examination Report, *Communication pursuant to Article 94(3) EPC*, filed in the European Patent Office on Mar. 9, 2009 for EP Patent Application No. 05 850 014.1-1213 pp. 1-5.

Response to European Examination Report, *Communication pursuant to Article 94(3) EPC*, filed in the European Patent Office on May 10, 2011 for EP Patent Application No. 05 850 014.1-1213 pp. 1-8.

PCT International Search Report and Written Opinion from corresponding International Application No. PCT/US2005/042777 mailed Apr. 27, 2006, pp. 1-14.

PCT Notification Concerning Transmittal of International Preliminary Report on Patentability, from corresponding International Application No. PCT/US2005/042777 mailed Jun. 7, 2007, pp. 1-11.

US 7,815,831, 10/2010, Patel (withdrawn)

* cited by examiner

PTFE MEMBRANE

This application claims the benefit of U.S. Provisional Patent Application Ser. No. 60/631,087, filed Nov. 24, 2004, which application is hereby incorporated by reference in its entirety.

FIELD OF THE INVENTION

The present invention is directed to an improved breathable membrane, in particular to a polytetrafluoroethylene (PTFE) membrane having improved thermal stability properties.

BACKGROUND

PTFE membranes, especially expanded PTFE membranes, are widely used for making breathable, waterproof fabrics. However, many PTFE membranes are dimensionally unstable due to the stress associated with manufacturing processes, including those described in U.S. Pat. No. 3,315,020 (hereafter "the '020 patent"). The '020 patent describes stretching a PTFE film unilaterally and bi-axially under tension, resulting in a membrane that has significant dimensional instability, especially at elevated temperatures such as experienced in fire fighting garments and many industrial filtration applications.

The dimensional instability of current stretched PTFE films can pose significant problems in applications where the PTFE membranes are used in composite constructions that contain layers of dissimilar materials. These dissimilar materials each exhibit dimensional changes at a much lesser degree to that of most conventional PTFE membranes under the same conditions. In such cases, products that incorporate a PTFE membrane as a component of a composite construction can develop inter-laminar shearing of the various layers under elevated ambient temperature conditions due to the different rates of expansion and contraction. Resulting effects of the above-described conditions are often a weak and/or unattractive product. In addition, product failure can occur prematurely by having delamination of the various layers.

Therefore, a need exists for a PTFE membrane having improved dimensional stability.

SUMMARY OF THE INVENTION

The present invention is directed to a method for improving the dimensional stability of PTFE membranes, as well as to dimensionally stabilized PTFE membranes made using the method of the invention. The process described herein reduces and/or eliminates the relaxation stress normally associated with PTFE membranes made using previously existing methods.

The invention is directed, in part, to a method of improving the dimensional stability of a PTFE membrane. In certain implementations the method includes subjecting the PTFE membrane to elevated temperatures for a given exposure time; and simultaneously subjecting the PTFE membrane to an elevated pressure for a given exposure time, wherein the effects on the dimensional stability are dictated at least in part by the combination of the temperature, pressure and exposure time(s).

In particular, the invention is directed, in part, to a method of affecting the dimensional stability of a PTFE membrane by subjecting the PTFE membrane to elevated temperatures for a given exposure time, and subjecting the PTFE membrane to an elevated pressure for a given exposure time. During this process, the PTFE membrane is simultaneously subjected to the elevated temperature and elevated pressure, and the effects on the dimensional stability are dictated at least in part by the combination of the temperature, pressure and exposure time.

In some implementations of the invention, the membrane is elevated to a temperature of about 325° C. or more, in others it is elevated to a temperature of about 340° C. or more. Typically the temperature is elevated to a temperature above about 325° C. and below about 40° C., often to a temperature above about 350° C. and below about 360° C., and sometimes to a temperature above about 360° C. and below about 380° C.

The membrane can be heated to an elevated temperature using an apparatus such as a roller having a temperature in excess of about 335° C. or in excess of about 350° C., although other heating methods can also be used. Typically the temperature of the roller or other apparatus is at least 10° C., more commonly at least about 20° C., higher than the desired peak temperature of the PTFE membrane during processing. Thus, in some implementations, the membrane is heated to an elevated temperature using a roller having a temperature in excess of about 360° C.

As noted above, the PTFE membrane should also be simultaneously compressed under elevated pressure at the same time that it is being heated. In most implementations of the invention, the membrane is heated to an elevated temperature of about 325° C. or more while simultaneously being compressed under a pressure of at least 1 pound per square inch. In some implementations the membrane is heated to an elevated temperature of at least about 325° C. while simultaneously being compressed under a pressure of at least 5 pounds per square inch. In yet other implementations the membrane is heated to an elevated temperature of at least about 325° C. while simultaneously being compressed under a pressure of at least 20 pounds per square inch.

The period of time during which the membrane is raised to an elevated temperature can vary depending upon the implementation, but is generally less than 1 second, for example 0.1 to 1.0 seconds. In some implementations, the time period of elevated temperature is 0.05 to 0.5 seconds. The period of time during which the membrane is exposed to elevated pressure can also vary depending upon the implementation, but is generally less than 1 second, for example 0.1 to 1.0 seconds. In some implementations, the time period of elevated temperature is 0.05 to 0.5 seconds. It is not necessary that the time period of elevated temperature be the same as the time period of elevated pressure.

PTFE membranes made in accordance with the present invention show improved dimensional stability relative to untreated PTFE laminates that are either unilaterally or bilaterally expanded. In some embodiments, the shrinkage is less than 10 percent in the machine direction, and often less than 5 percent in the machine direction. The resulting PTFE membrane typically also has favorable breathability, porosity, and other characteristics relevant to making a breathable fabric. For example, in certain embodiments the PTFE membrane has air permeability of at least 4 liters per minute per square centimeter at 0.7 bar.

The above summary of the present invention is not intended to describe each discussed embodiment of the present invention. This is the purpose of the figures and the detailed description that follow.

BRIEF DESCRIPTION OF THE DRAWINGS

The invention may be more completely understood in consideration of the following detailed description of various embodiments of the invention in connection with the accompanying drawings, in which.

DETAILED DESCRIPTION

Figure 1:
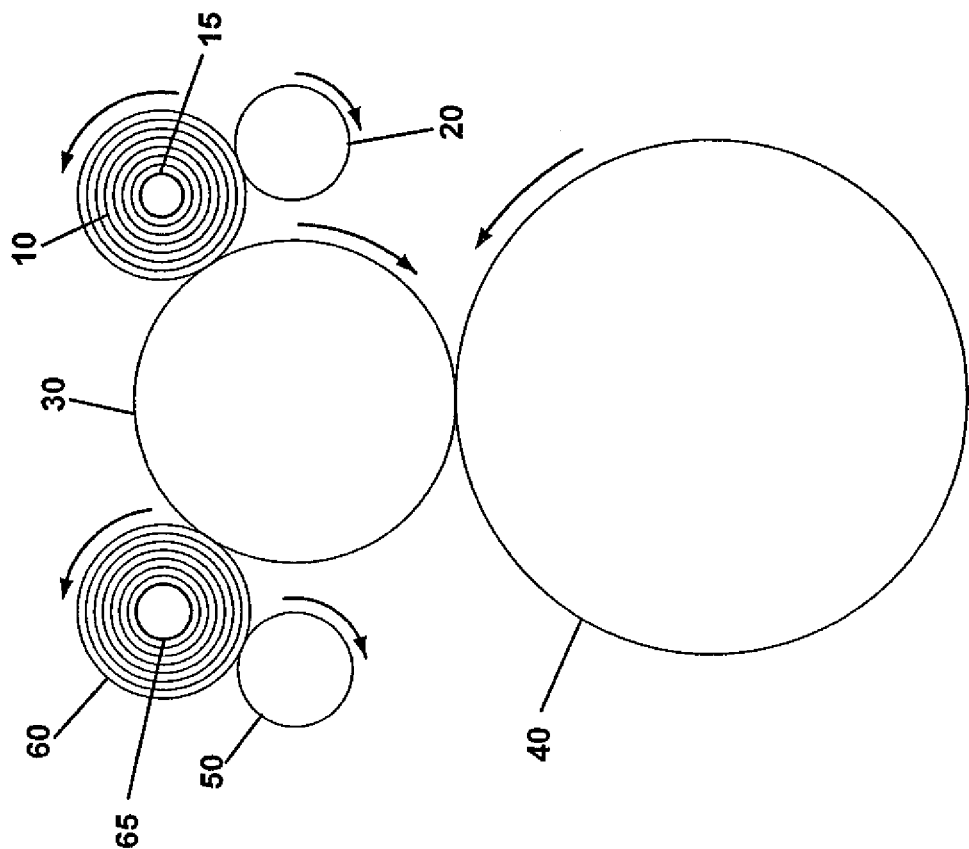
FIG. 1 shows a schematic diagram of an apparatus for use in forming a stabilized PTFE membrane in accordance with the present invention.

The present invention is directed to a method for improving the dimensional stability of PTFE membranes, as well as to dimensionally stabilized PTFE membranes made using the method of the invention. The process described herein reduces and/or eliminates the relaxation stress normally associated with PTFE membranes made using previously existing methods.

In particular, the invention is directed in part to a method of affecting the dimensional stability of a PTFE membrane by subjecting the PTFE membrane to elevated temperature and pressure. The membrane that is thermally treated in accordance with the invention can be made in accordance with the teachings of, for example, U.S. Pat. Nos. 3,953,566; 4,187,390; and 4,194,041, which are incorporated herein by reference. During the process of the invention, the PTFE membrane is simultaneously subjected to the elevated temperatures and elevated pressures, and the effects on the dimensional stability are dictated at least in part by the combination of the temperature, pressure and exposure time.

When PTFE is polymerized, it is laid down in chain-extended crystalline form, with typical crystallinity on the order of 95% and a melting point of about 344° C. After melting, it recrystallizes in a less ordered form and the original high degree of crystallinity is never recovered. The melting point drops to about 332° C., and the heat of melting drops by approximately two thirds. The reproducibility of this irreversible shift after the first melt is what allows the dimensional stability of heat stabilized membranes.

As noted above, it has been found that by subjecting PTFE unilaterally and/or bi-axially fibrillated membranes to temperatures above the crystalline melting point, generally about 327° C. (621° F.) at atmospheric pressure, the built-in stress is significantly reduced and the PTFE membrane has improved dimensional stability. In some implementations, depending on the conditions, an elevated temperate above 325° C. is suitable, in others a temperate above 327° C. is used, and in others it is elevated to a temperature above 340° C. Typically the temperature is elevated to a temperature of at least about 320° C. and below about 450° C., often to a temperature at least about 330° C., and sometimes to a temperature at least about 360° C. The PTFE membrane should also be simultaneously compressed while it is being heated. In most implementations of the invention, the membrane is heated to an elevated temperature above about 327° C. while simultaneously being compressed under a pressure of at least 1 pound per square inch. In some implementations, the membrane is heated to an elevated temperature above about 327° C. while simultaneously being compressed under a pressure of at least 5 pounds per square inch. In yet other implementations, the membrane is heated to an elevated temperature above 327° C. while simultaneously being compressed under a pressure of at least 20 pounds per square inch.

The period of time during which the membrane is raised to an elevated temperature can vary depending upon the implementation, but is generally less than about 1 second, such as 0.1 to 1.0 seconds. In some implementations, the time period of elevated temperature is about 0.05 to 0.5 second. In certain implementations, the time period is less than 0.5 second, less than 0.1 second, or even less than 0.01 second.

The membrane can be heated to an elevated temperature using a roller having a temperature in excess of 340° C., although other heating methods can also be used. Typically the temperature of the roller is at least 10° C., more commonly at least 20° C., higher than the desired peak temperature of the PTFE membrane during the processing.

After exposure to heat and pressure, the resulting PTFE membrane typically has favorable breathability, porosity, and other characteristics relevant for making a breathable fabric, such as a breathable multi-layer fabric. For example, in certain embodiments, the treated PTFE membrane has air permeability of at least 4 liters per minute per square centimeter at 0.7 bar. Also, in some implementations, the PTFE membrane has a Coulter Porometer of at least 0.10 MFP, and more desirably at least 0.20 MFP, and even more desirably at least 0.25 MFP.

The resulting PTFE membrane has numerous suitable uses, including in a laminate, used for example for clothing. Outerwear and fire fighting garments are examples of clothing that can utilize laminates made from dimensionally stabilized PTFE. The resulting PTFE is also suitable for filtration, such as air or gas filtration, liquid filtration, and chemical cake filtration.

PTFE membranes treated in accordance with the present invention show improved dimensional stability relative to untreated PTFE laminates that are either unilaterally or bilaterally expanded. In some embodiments, the shrinkage is less than 10 percent in the machine direction, and often less than 5 percent in the machine direction.

One problem associated with heating PTFE membranes to this elevated temperature is that shrinkage of the membrane may occur, resulting in dimensional loss. The following described process minimizes dimensional instability while adding toughness. Temperature, pressure, and duration of heating are regulated to provide a desired dimensionally stabilized PTFE membrane. In certain embodiments of the invention the process includes using a driven heated steel roll, a rubber nip roll, and idle rolls in line with the rubber nip roll.

The following process ranges establish optimum settings, in this general embodiment, for each variable of the treating process. First, with regard to temperature, recommended heating temperatures are generally greater than about 340° C., and generally less than 400° C. However, useful ranges can extend outside of these values. In most implementations the temperature range is from about 350° C. to 390° C., often from about 360° C. to 380° C. As noted above, it is desirable to raise the temperature of the PTFE membrane to at or above the crystalline melting point of PTFE, which is about 327° C., which can be done using a heated roll that is at or above 327° C. The longer the time period when the PTFE film is in contact with the heated roll, the lower (in general) the desired temperature of the heated roll.

The duration at which the membrane is held under the elevated temperature is usually quite brief, typically a matter of tenths of a second or even less than thousands of a second, depending on the temperature of the heated steel roll. Durations of 0.10 to 1.0 seconds are satisfactory for some implementations, while durations of 0.05 to 0.50 seconds are suitable for most implementations, although longer and shorter durations can also be sufficient under some circumstances.

The pressure under which the PTFE membrane is maintained is generally at least 1 pound per square inch (PSI), but more typically greater than 5 PSI, and even more typically greater than 20 PSI. The duration at which the membrane is held under the elevated pressure is usually the same as the duration of the elevated temperature.

In accordance with the general method, a prepared extended length of PTFE membrane, e.g., in roll form, is nipped between two surfaces, at least one of which is heated to an elevated temperature. Often, the PTFE membrane is nipped between two cylinders or rolls, as is commonly known. One or both of the rolls may be heated.

Reference is now made to FIG. 1, which shows a length of PTFE membrane 10 wound on a core 15. Process equipment includes an idle roll 20, a nip formed between roll 30 and roll 40, and a second idle roll 50. FIG. 1 also shows a length of dimensionally stabilized PTFE membrane 60 wound on a core 65.

In a first example embodiment, an extended length of biaxially stretched PTFE membrane, e.g., PTFE 10 on core 15, is placed on one side of a nip roll, e.g., roll 30, resting on an idle roll, e.g., 20, and the nip roll, e.g., 30. The PTFE membrane 10 travels against the nip roll 30 around to a position just opposite where the membrane roll 10/15 has been placed. A take-up roll, e.g., core 65, is positioned between the nip roll 30 and an idle roll, e.g., second idle roll 50, on that side. Once the membrane 10 has been configured around the nip roll 30, the nip roll 30 is lowered until it comes in contact with a second roll, e.g., roll 40, which could be a turning heated steel roll. Once contact is made, the nip roll 30 carries the membrane 10 over the heated steel roll 40 subjecting the membrane 10 to the heat and restricting its movement while being pressed. The membrane 10 when pressed between the nip roll 30 and the steel roll 40 is subjected to temperatures above the crystalline temperature resulting in set or stabilized PTFE.

The following examples show test results of standard expanded PTFE membrane (commercially available from Donaldson Co. under the designation Tetratex TX2203) compared to the same membrane after being heat treated in accordance with the invention.

The standard expanded PTFE membrane was heated to a temperature above 327° C. while simultaneously being compressed under a pressure of at least 20 pounds per square inch using the equipment set-up illustrated in FIG. 1.

TABLE 1

| Membrane | | Standard | Heat Treated |
|---|---|---|---|
| Air Permeability | Textest (cfm) | 0.7 | 0.4 |
| | Coutler (L/min/cm2 @ 0.7 bar) | 7.0 | 4.0 |
| Pore Distribution | Minimum | 0.32 | 0.26 |
| | Maximum | 0.44 | 0.33 |
| Coulter Porometer | MFP | 0.37 | 0.29 |
| Shrinkage % | Machine direction | 30.0 | 3.0 |
| | Transverse direction | 22.7 | 3.5 |

As shown in Table 1 above, the heat and pressure treated membrane has far less shrinkage in both the machine direction and the transverse direction after being treated in accordance with the present invention. In addition, although there is some diminishment in air permeability, the heat and pressure treated membrane still have relatively high values for permeability and pore distribution.

Figure 2:
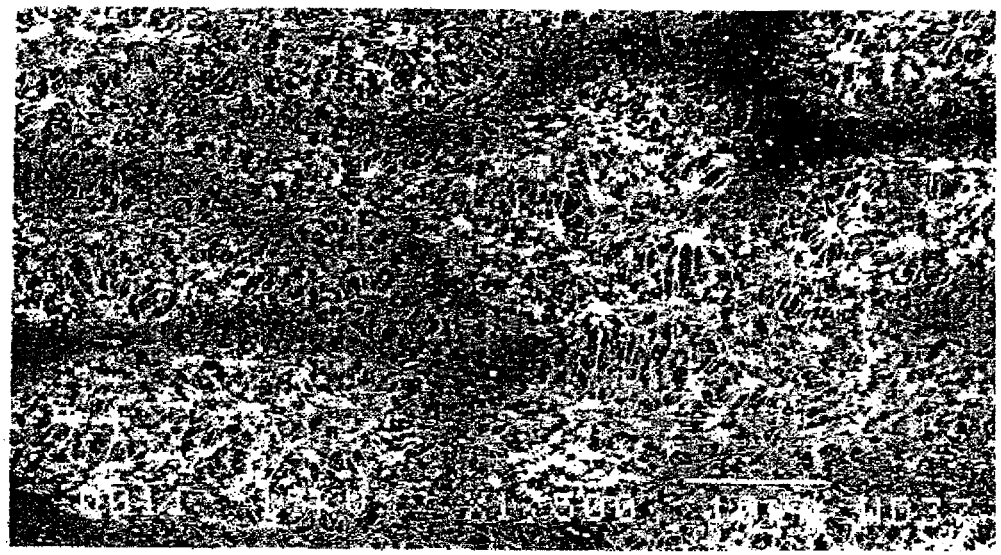
FIG. 2 shows two electron micrographs of a PTFE membrane made in accordance with the invention.
Figure 2:
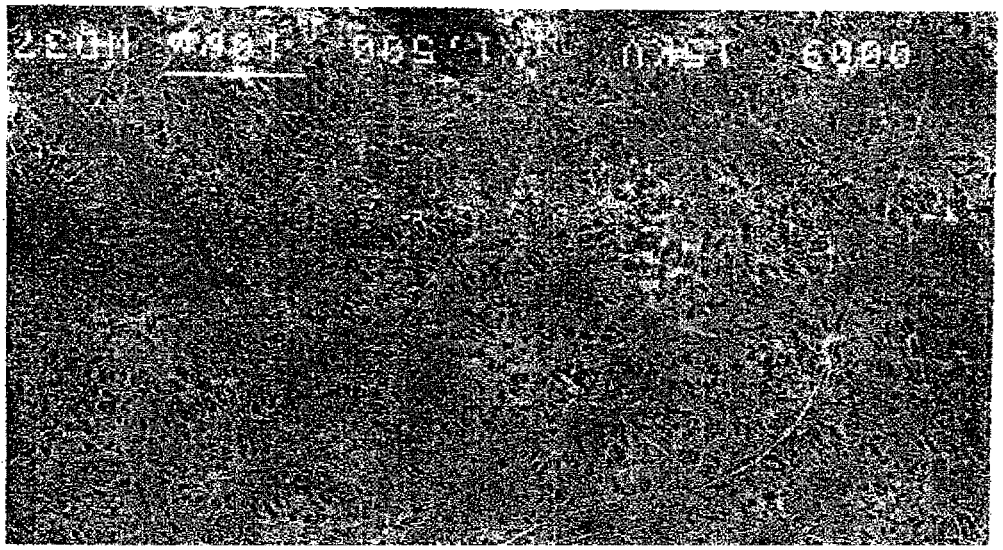

FIG. 2 shows two scanning electron micrographs of PTFE membranes made in accordance with the invention, the two micrographs taken under different lighting conditions.

Table 2, below, shows test results from additional examples of heat and pressure treated membranes, treated in the same manner as above.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

TABLE 2

| Sample Number | | Thick (mil) | Density (g/cc) | Bubble Point (psi) | Gurley Airflow (secs) | Coulter | | | Shrinkage | |
|---|---|---|---|---|---|---|---|---|---|---|
| | | | | | | Perm | MAX | MFP | M.D. (%) | T.D. (%) |
| 1 | Original Average | 3.50 | 0.20 | 3.00 | 1.62 | 32.09 | 3.94 | 2.91 | 8.10 | 18.80 |
| | Average After Heat Setting | 1.90 | 0.38 | 3.40 | 1.72 | 22.04 | 2.57 | 1.15 | 2.00 | 6.00 |
| 2 | Original Average | 3.70 | 0.22 | 5.50 | 3.60 | 22.62 | 2.76 | 2.10 | 8.10 | 19.70 |
| | Average After Heat Setting | 2.70 | 0.30 | 4.60 | 3.60 | 16.59 | 1.66 | 1.33 | 3.00 | 3.20 |
| 3 | Original Average | 2.70 | 0.21 | 9.00 | 6.00 | 14.32 | 1.05 | 0.86 | 9.60 | 16.70 |
| | Average After Heat Setting | 2.30 | 0.33 | 6.40 | 4.70 | 16.67 | 1.29 | 1.08 | 9.40 | 6.30 |
| 4 | Original Average | 3.50 | 0.32 | 12.00 | 6.00 | 9.54 | 0.89 | 0.73 | 14.40 | 16.90 |
| | Average After Heat Setting | 2.70 | 0.35 | 8.70 | 9.10 | 7.87 | 0.78 | 0.64 | 6.95 | 11.00 |
| 5 | Original Average | 3.30 | 0.30 | 20.50 | 18.00 | 4.36 | 0.38 | 0.33 | 22.50 | 6.90 |
| | Average After Heat Setting | 2.60 | 0.36 | 16.30 | 20.30 | 4.46 | 0.39 | 0.34 | 7.90 | 9.40 |
| 6 | Original Average | 2.70 | 0.37 | 29.00 | 21.00 | 2.71 | 0.29 | 0.25 | 30.60 | 7.80 |
| | Average After Heat Setting | 2.40 | 0.44 | 23.30 | 22.90 | 3.26 | 0.33 | 0.29 | 14.10 | 11.00 |
| 7 | Original Average | 0.50 | 0.50 | 39.00 | 8.40 | 9.50 | 0.24 | 0.22 | 35.00 | 9.10 |
| | Average After Heat Setting | 0.16 | 1.38 | 37.30 | 20.83 | 4.14 | 0.24 | 0.21 | 3.00 | 0.00 |

We claim:

1. A method of affecting the dimensional stability of a porous PTFE membrane, comprising:

a) subjecting a porous PTFE membrane to an elevated temperature above the melting point of the PTFE membrane for a given exposure time, wherein the membrane is heated to an elevated temperature using a roller; and b) simultaneously subjecting the PTFE membrane to compression between two surfaces for the given exposure time, wherein the membrane is compressed under a pressure of at least 1 pound per square inch;

wherein the PTFE membrane after being subjected to the elevated temperature and compression remains porous and has a Coulter Porometer of at least 0.1 MFP.

2. The method of affecting the dimensional stability of a PTFE membrane of claim 1, wherein subjecting the porous PTFE membrane to an elevated temperature comprises elevating the membrane temperature to above about 327° C.

3. The method of affecting the dimensional stability of a PTFE membrane of claim 1, wherein subjecting the porous PTFE membrane to an elevated temperature comprises elevating the membrane temperature to above about 340° C.

4. The method of affecting the dimensional stability of a PTFE membrane of claim 1, wherein subjecting the porous PTFE membrane to an elevated temperature comprises elevating the membrane temperature to above about 325° C. and below about 400° C.

5. The method of affecting the dimensional stability of a PTFE membrane of claim 1, wherein subjecting the porous PTFE membrane to an elevated temperature comprises elevating the membrane temperature to above about 350° C. and below about 360° C.

6. The method of affecting the dimensional stability of a PTFE membrane of claim 1, wherein subjecting the porous PTFE membrane to an elevated temperature comprises elevating the membrane temperature to above about 360° C. and below about 380° C.

7. The method of affecting the dimensional stability of a PTFE membrane of claim 1, wherein the roller has a temperature in excess of about 340° C.

8. The method of affecting the dimensional stability of a PTFE membrane of claim 1, wherein the roller has a temperature in excess of about 360° C.

9. The method of affecting the dimensional stability of a PTFE membrane of claim 1, wherein subjecting the porous PTFE membrane to an elevated temperature comprises elevating the membrane temperature to above about 327° C., and wherein the membrane is compressed under a pressure of at least 5 pounds per square inch.

10. The method of affecting the dimensional stability of a PTFE membrane of claim 1, wherein subjecting the porous PTFE membrane to an elevated temperature comprises elevating the membrane temperature to above about 327° C., and wherein the membrane is compressed under a pressure of at least 20 pounds per square inch.

11. The method of affecting the dimensional stability of a PTFE membrane of claim 1, wherein the given exposure time is from 0.1 to 1 second.

12. The method of affecting the dimensional stability of a PTFE membrane of claim 1, wherein the given exposure time is from 0.05 to 0.5 seconds.

13. A method of processing a porous PTFE membrane, the method comprising the steps of:

a) providing an oriented, porous PTFE membrane that has been at least unilaterally oriented;

b) for a period of less than 1 second, simultaneously subjecting the PTFE membrane to a temperature of at least 340° C. and compression between two surfaces wherein the membrane is compressed under a pressure of at least 1 pound per square inch;

wherein the PTFE membrane after being subjected to the elevated temperature and compression has a Coulter Porometer of at least 0.1 MFP.

* * * * *